US007121267B2

United States Patent
Perry et al.

(10) Patent No.: US 7,121,267 B2
(45) Date of Patent: Oct. 17, 2006

(54) POPPET FOR AN INTEGRATED PRESSURE MANAGEMENT APPARATUS AND FUEL SYSTEM AND METHOD OF MINIMIZING RESONANCE

(75) Inventors: Paul Perry, Chatham (CA); Andre Veinotte, Dresden (CA)

(73) Assignee: Siemens VDO Automotive, Inc., Chatham (CA)

( * ) Notice: Subject to any disclaimer, the term of this patent is extended or adjusted under 35 U.S.C. 154(b) by 360 days.

(21) Appl. No.: 10/794,087

(22) Filed: Mar. 8, 2004

(65) Prior Publication Data

US 2004/0173263 A1    Sep. 9, 2004

Related U.S. Application Data

(60) Provisional application No. 60/452,651, filed on Mar. 7, 2003.

(51) Int. Cl.
*F16K 17/19*    (2006.01)
(52) U.S. Cl. .................. 123/516; 123/518; 137/514.5; 137/543.15; 137/493.9
(58) Field of Classification Search ................ 123/516, 123/518, 519, 520; 137/514.5, 493.9, 494, 137/543.15
See application file for complete search history.

(56) References Cited

U.S. PATENT DOCUMENTS

| 2,157,299 | A | 5/1939 | Mercier |
|---|---|---|---|
| 2,330,881 | A | 10/1943 | Gora |
| 3,110,502 | A | 11/1963 | Pagano |
| 3,129,885 | A | 4/1964 | Freismuth |
| 3,516,279 | A | 6/1970 | Maziarka |
| 3,586,016 | A | 6/1971 | Meyn |
| 3,640,501 | A | 2/1972 | Walton |
| 3,685,501 | A | 8/1972 | Honda |
| 3,720,090 | A | 3/1973 | Halpert et al. |
| 3,754,568 | A | 8/1973 | Gallagher et al. |
| 3,802,267 | A | 4/1974 | Lofink |
| 3,841,344 | A | 10/1974 | Slack |
| 3,861,646 | A | 1/1975 | Douglas |
| 3,871,177 | A | 3/1975 | Ridler |
| 3,927,553 | A | 12/1975 | Frantz |
| 4,009,985 | A | 3/1977 | Hirt |
| 4,136,854 | A | 1/1979 | Ehmig et al. |

(Continued)

FOREIGN PATENT DOCUMENTS

DE    3907 408    9/1990

(Continued)

OTHER PUBLICATIONS

U.S. Appl. No. 09/565,028, filed May 5, 2000, Perry et al., Method of Managing Pressure in a Fuel System.

*Primary Examiner*—Thomas Moulis

(57) ABSTRACT

An integrated pressure management apparatus, system and method for minimizing resonance of a poppet. A housing defines a fluid communication passage between ports. The housing includes a first portion, which extends along an axis, and has a first surface parallel to the axis. A poppet is movable between a first configuration that prevents fluid communication between the ports, and a second configuration that permits fluid communication between the ports. The poppet includes a second portion. The second portion is translatable along the axis relative to the housing, and includes a tubular stem that has a second surface parallel to the axis. The second portion nests with the first portion so as to define a gap between the first and second surfaces. The first and second portions define a chamber, and the gap restricts fluid flow between the fluid communication passage and the chamber.

29 Claims, 4 Drawing Sheets

U.S. PATENT DOCUMENTS

| | | |
|---|---|---|
| 4,164,168 A | 8/1979 | Tateoka |
| 4,166,485 A | 9/1979 | Wokas |
| 4,215,846 A | 8/1980 | Ishizuka et al. |
| 4,240,467 A | 12/1980 | Blatt et al. |
| 4,244,554 A | 1/1981 | DiMauro et al. |
| 4,354,383 A | 10/1982 | Härtel |
| 4,368,366 A | 1/1983 | Stocker |
| 4,422,242 A | 12/1983 | Kawamura et al. |
| 4,425,940 A * | 1/1984 | Cook ...................... 137/627.5 |
| 4,474,208 A | 10/1984 | Looney |
| 4,494,571 A | 1/1985 | Seegers et al. |
| 4,518,329 A | 5/1985 | Weaver |
| 4,561,297 A | 12/1985 | Holland |
| 4,616,114 A | 10/1986 | Strasser |
| 4,717,117 A | 1/1988 | Cook |
| 4,766,557 A | 8/1988 | Twerdochlib |
| 4,766,927 A | 8/1988 | Conatser |
| 4,852,054 A | 7/1989 | Mastandrea |
| 4,901,559 A | 2/1990 | Grabner |
| 4,905,505 A | 3/1990 | Reed |
| 4,922,957 A | 5/1990 | Johnson |
| 4,925,157 A | 5/1990 | Troy |
| 5,036,823 A | 8/1991 | MacKinnon |
| 5,058,232 A | 10/1991 | Stohr |
| 5,069,188 A | 12/1991 | Cook |
| 5,090,234 A | 2/1992 | Maresca, Jr. et al. |
| 5,096,029 A | 3/1992 | Bauer et al. |
| 5,101,710 A | 4/1992 | Baucom |
| 5,115,785 A | 5/1992 | Cook |
| 5,116,257 A * | 5/1992 | Szlaga ........................ 137/43 |
| 5,152,360 A | 10/1992 | Haefner et al. |
| 5,191,870 A | 3/1993 | Cook |
| 5,193,512 A | 3/1993 | Steinbrenner et al. |
| 5,207,242 A * | 5/1993 | Daghe et al. ............. 137/454.6 |
| 5,209,210 A | 5/1993 | Ikeda et al. |
| 5,211,151 A | 5/1993 | Nakajima et al. |
| 5,253,629 A * | 10/1993 | Fornuto et al. ............. 123/519 |
| 5,259,424 A | 11/1993 | Miller et al. |
| 5,263,462 A | 11/1993 | Reddy |
| 5,263,685 A | 11/1993 | Winnike et al. |
| 5,273,071 A | 12/1993 | Oberrecht |
| 5,317,909 A | 6/1994 | Yamada et al. |
| 5,327,934 A | 7/1994 | Thompson |
| 5,337,262 A | 8/1994 | Luthi et al. |
| 5,367,997 A | 11/1994 | Kawamura et al. |
| 5,372,032 A | 12/1994 | Filippi et al. |
| 5,375,455 A | 12/1994 | Maresca, Jr. et al. |
| 5,388,613 A | 2/1995 | Krüger |
| 5,390,643 A | 2/1995 | Sekine |
| 5,390,645 A | 2/1995 | Cook et al. |
| 5,415,033 A | 5/1995 | Maresca, Jr. et al. |
| 5,429,097 A | 7/1995 | Wojts-Saary et al. |
| 5,429,099 A * | 7/1995 | DeLand ...................... 123/520 |
| 5,437,257 A | 8/1995 | Giacomazzi et al. |
| 5,448,980 A | 9/1995 | Kawamura et al. |
| 5,474,050 A | 12/1995 | Cook et al. |
| 5,507,176 A | 4/1996 | Kammeraad et al. |
| 5,524,662 A | 6/1996 | Benjey et al. |
| 5,562,084 A * | 10/1996 | Shimamura .................. 123/520 |
| 5,564,306 A | 10/1996 | Miller |
| 5,579,742 A | 12/1996 | Yamazaki et al. |
| 5,584,271 A | 12/1996 | Sakata |
| 5,603,349 A | 2/1997 | Harris |
| 5,614,665 A | 3/1997 | Curran et al. |
| 5,635,630 A | 6/1997 | Dawson et al. |
| 5,644,072 A | 7/1997 | Chirco et al. |
| 5,671,718 A | 9/1997 | Curran et al. |
| 5,681,151 A | 10/1997 | Wood |
| 5,687,633 A | 11/1997 | Eady |
| 5,743,169 A | 4/1998 | Yamada |
| 5,803,056 A | 9/1998 | Cook et al. |
| 5,826,566 A | 10/1998 | Isobe et al. |
| 5,863,025 A | 1/1999 | Noya |
| 5,878,729 A | 3/1999 | Covert et al. |
| 5,884,609 A | 3/1999 | Kawamoto et al. |
| 5,893,389 A | 4/1999 | Cunningham |
| 5,894,784 A | 4/1999 | Bobbitt, III et al. |
| 5,911,209 A | 6/1999 | Kouda et al. |
| 5,974,861 A | 11/1999 | Cook et al. |
| 5,979,869 A | 11/1999 | Hiddessen |
| 6,003,499 A | 12/1999 | Devall et al. |
| 6,053,151 A | 4/2000 | Cook et al. |
| 6,073,487 A | 6/2000 | Dawson |
| 6,086,014 A | 7/2000 | Bragg, Jr. |
| 6,089,081 A | 7/2000 | Cook et al. |
| 6,142,062 A | 11/2000 | Streitman |
| 6,145,430 A | 11/2000 | Able et al. |
| 6,168,168 B1 | 1/2001 | Brown |
| 6,202,688 B1 | 3/2001 | Khadim |
| 6,203,022 B1 | 3/2001 | Struschka et al. |
| 6,328,021 B1 | 12/2001 | Perry et al. |
| 6,343,505 B1 | 2/2002 | Cook et al. |
| 6,450,153 B1 | 9/2002 | Perry |
| 6,453,942 B1 | 9/2002 | Perry |
| 6,460,566 B1 | 10/2002 | Perry et al. |
| 6,470,861 B1 | 10/2002 | Perry |
| 6,470,908 B1 | 10/2002 | Perry |
| 6,474,313 B1 | 11/2002 | Perry et al. |
| 6,474,314 B1 | 11/2002 | Perry et al. |
| 6,478,045 B1 | 11/2002 | Perry |
| 6,481,415 B1 | 11/2002 | Cook |
| 6,484,555 B1 | 11/2002 | Perry et al. |
| 6,502,560 B1 | 1/2003 | Perry |
| 6,505,514 B1 | 1/2003 | Perry |
| 6,546,779 B1 | 4/2003 | Oliver |
| 6,623,012 B1 | 9/2003 | Perry et al. |
| 6,708,552 B1 | 3/2004 | Weldon |
| 6,840,232 B1 * | 1/2005 | Perry ........................ 123/518 |
| 6,851,443 B1 * | 2/2005 | Veinotte et al. ................ 137/2 |
| 2003/0000289 A1 | 1/2003 | Weldon |

FOREIGN PATENT DOCUMENTS

| | | |
|---|---|---|
| EP | 0 462 824 | 12/1991 |
| EP | 0 604 285 | 6/1994 |
| EP | 0 688 691 | 12/1995 |
| WO | WO 99 50551 | 10/1999 |
| WO | WO 01 387 16 | 5/2000 |

* cited by examiner

POPPET FOR AN INTEGRATED PRESSURE MANAGEMENT APPARATUS AND FUEL SYSTEM AND METHOD OF MINIMIZING RESONANCE

CROSS REFERENCE TO RELATED APPLICATIONS

This application claims the benefit of the earlier filing date of U.S. Provisional Application No. 60/452,651, filed 7 Mar. 2003, which is incorporated by reference herein in its entirety.

FIELD OF THE INVENTION

A fuel vapor pressure management apparatus that manages pressure and detects leaks in a fuel system. In particular, a fuel vapor pressure management apparatus that vents positive pressure, vents excess negative pressure, and uses evaporative natural vacuum to perform a leak diagnostic.

BACKGROUND OF THE INVENTION

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

It is believed that excess fuel vapor can accumulate immediately after engine shutdown, thereby creating a positive pressure in the fuel system. Excess negative pressure in closed fuel systems can occur under some operating and atmospheric conditions, thereby causing stress on components of these fuel systems. Thus, it is believed that there is a need to vent, or "blow-off," the positive pressure, and to vent, or "relieve," the excess negative pressure. Similarly, it is also believed to be desirable to relieve excess positive pressure that can occur during tank refueling. Thus, it is believed that there is a need to allow air, but not fuel vapor, to exit the tank at high flow rates during tank refueling. This is commonly referred to as onboard refueling vapor recovery (ORVR).

SUMMARY OF THE INVENTION

The present invention provides an integrated pressure management apparatus including a housing, a poppet and a chamber. The housing defines a fluid communication passage between first and second fluid ports. The housing includes a first portion that extends along an axis, and the first portion has a first surface parallel to the axis. The poppet is movable between a first configuration that prevents fluid communication between the first and second ports, and a second configuration that permits fluid communication between the first and second ports. The poppet includes a second portion and a head. The second portion is translatable along the axis relative to the housing, and includes a tubular stem that has a second surface parallel to the axis. The second portion nests with the first portion so as to define a first gap between the first and second surfaces. The head is fixed to the tubular stem, and contiguously engages the housing so as to occlude the fluid communication passage when the poppet is in the first configuration. And the chamber is defined by the first and second portions, and the first gap communicates fluid between the chamber and the fluid communication passage.

The present invention also provides a fuel system for supplying fuel to an internal combustion engine. The fuel system includes a fuel tank having a headspace, a fuel vapor collection canister, an intake manifold of the internal combustion engine, a purge valve, and a fuel vapor pressure management apparatus. The fuel vapor collection canister has first and second sides, with the first side in fluid communication with the headspace. The purge valve includes an inlet and an outlet. The inlet is in fluid communication with the first side of the fuel vapor collection canister and the outlet is in fluid communication with the intake manifold. The fuel vapor pressure management apparatus includes first and second ports, a housing, and a poppet. The first port is in fluid communication with the second side of the fuel vapor collection canister, and the second port is in fluid communication with atmosphere. A first arrangement of the fuel vapor pressure management apparatus occurs when there is a first negative pressure level in the fuel vapor collection canister relative to atmosphere. A second arrangement of the fuel vapor pressure management apparatus permits a first fluid flow from atmosphere to the fuel vapor collection canister when there is a second negative pressure level less than the first negative pressure level. And a third arrangement of the fuel vapor pressure management apparatus permits a second fluid flow from the fuel vapor collection canister to atmosphere when there is a positive pressure in the fuel vapor collection canister relative to atmosphere. The housing defines a fluid communication passage that extends between the first and second ports. The housing includes a first portion that extends along an axis, and the first portion has a first surface parallel to the axis. The poppet is movable between first and second configurations. The first configuration prevents fluid communication between the first and second ports in the first arrangement, and the second configuration permits fluid communication between the first and second ports in the second and third arrangements. The poppet includes a second portion, which is translatable along the axis relative to the housing, and a head. The second portion includes a tubular stem that has a second surface parallel to the axis. The second portion nests with the first portion so as to define a gap between the first and second surfaces. And the head, which is fixed to the tubular stem, contiguously engages the housing so as to occlude the fluid communication passage in the first arrangement.

The present invention further provides a method of using naturally forming vacuum to evaluate a fuel system that supplies fuel to an internal combustion engine that includes an intake manifold. The fuel system includes a fuel tank, which has a headspace, and a fuel vapor collection canister, which has first and second sides. The first side of the fuel vapor collection canister is in fluid communication with the headspace and with a purge valve. The method includes coupling a fuel vapor pressure management apparatus in fluid communication between the second side of fuel vapor collection canister and atmosphere. The fuel vapor management apparatus includes a housing and a poppet. The housing defines a fluid communication passage that extends between first and second fluid ports, and the poppet moves between first and second configurations with respect to the housing. The first configuration prevents fluid communication between the first and second ports, and the second configuration permits fluid communication between the first and second ports. The method further includes damping resonance of the poppet in the second configuration.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of the liquid, e.g., fuel, in the enclosure. In the case of a fuel tank for volatile fuels, e.g., gasoline, vapors from the volatile fuel may be present in the headspace of the fuel tank.

Figure 1:
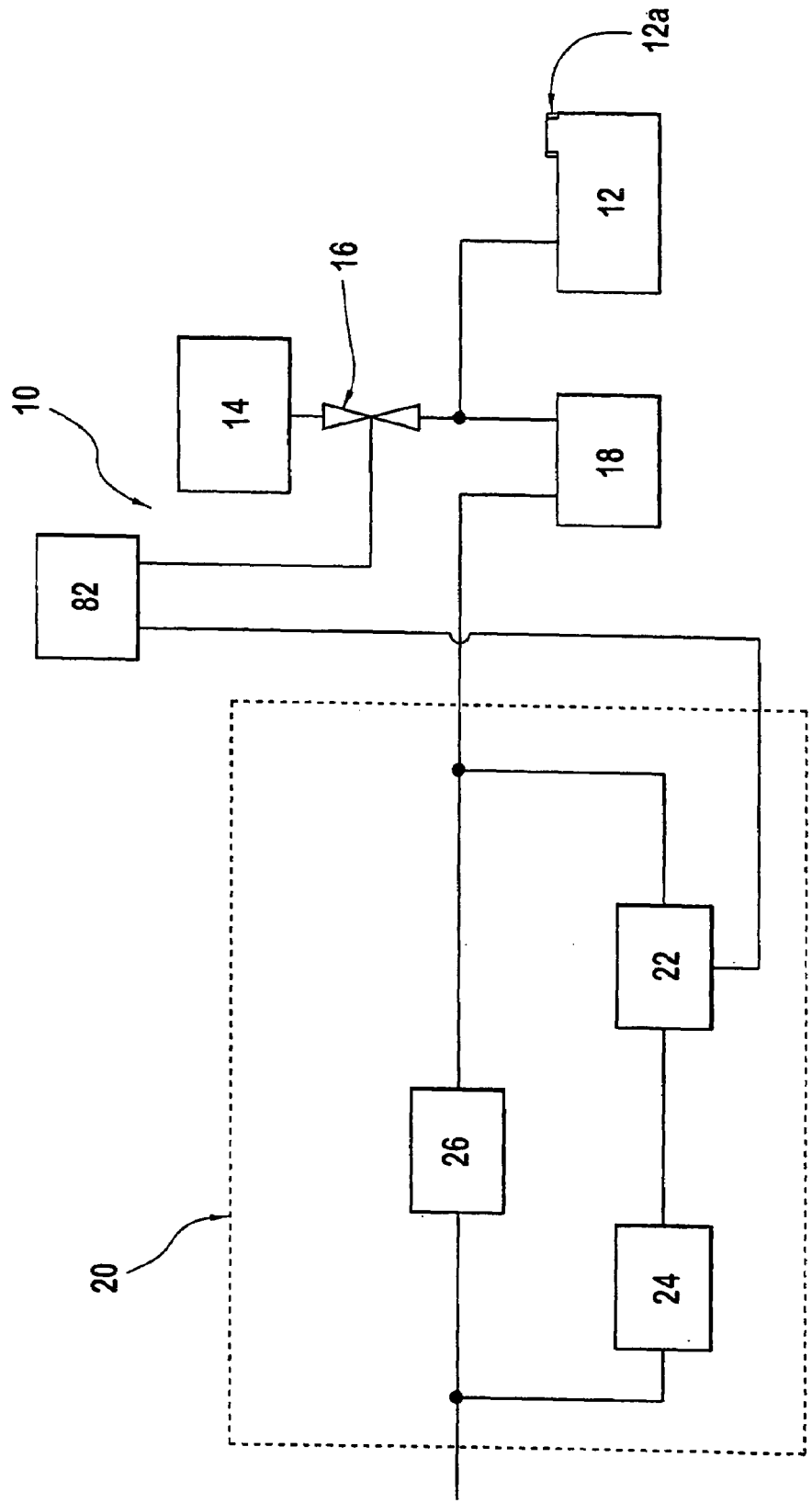
FIG. 1 is a schematic illustration showing a fuel system including an integrated pressure management apparatus according to the present invention.

Referring to FIG. 1, a fuel system 10, e.g., for an engine (not shown), includes a fuel tank 12, a vacuum source 14 such as an intake manifold of the engine, a purge valve 16, a fuel vapor collection canister 18 (also referred to as a "charcoal canister"), and an integrated pressure management apparatus (IPMA) 20.

The IPMA 20 performs a plurality of functions including signaling 22 that a first predetermined pressure (vacuum) level exists in the headspace of the fuel system 10, relieving pressure 24 (also referred to as relieving excess vacuum) in the headspace of the fuel system 10 at a value below the first predetermined pressure level, and relieving pressure 26 (also referred to as pressure blow-off) in the headspace of the fuel system 10 above a second pressure level. Relieving pressure 24,26 refers to the relieving pressure in the fuel vapor collection canister 18 and throughout the headspace of the fuel system 10 relative to the ambient atmospheric pressure A.

In the course of cooling that is experienced by the fuel system 10, e.g., after the engine is turned off, a vacuum is created in the fuel vapor collection canister 18. The existence of a vacuum at the first predetermined pressure level indicates that the integrity of the fuel system 10 is satisfactory. Thus, signaling 22 is used for indicating the integrity of the fuel system 10, i.e., that there are no appreciable leaks. Subsequently relieving pressure 24 at a pressure level below the first predetermined pressure level protects the integrity of the fuel tank 12, i.e., prevents it from collapsing due to vacuum in the fuel system 10.

Immediately after the engine is turned off, relieving pressure 26 allows excess pressure due to fuel vaporization to blow off, thereby facilitating the desired vacuum generation that occurs during cooling. During pressure blow-off, air within the fuel system 10 is released while fuel molecules are retained in the fuel vapor collection canister 18. Similarly, in the course of refueling the fuel tank 12, relieving pressure 26 allows air to exit the fuel tank 12 at high flow.

While the engine is turned on, controllably connecting 28 the fuel vapor collection canister 18 to the ambient air A allows confirmation of the purge flow and allows confirmation of the signaling 22 performance.

Figure 2:
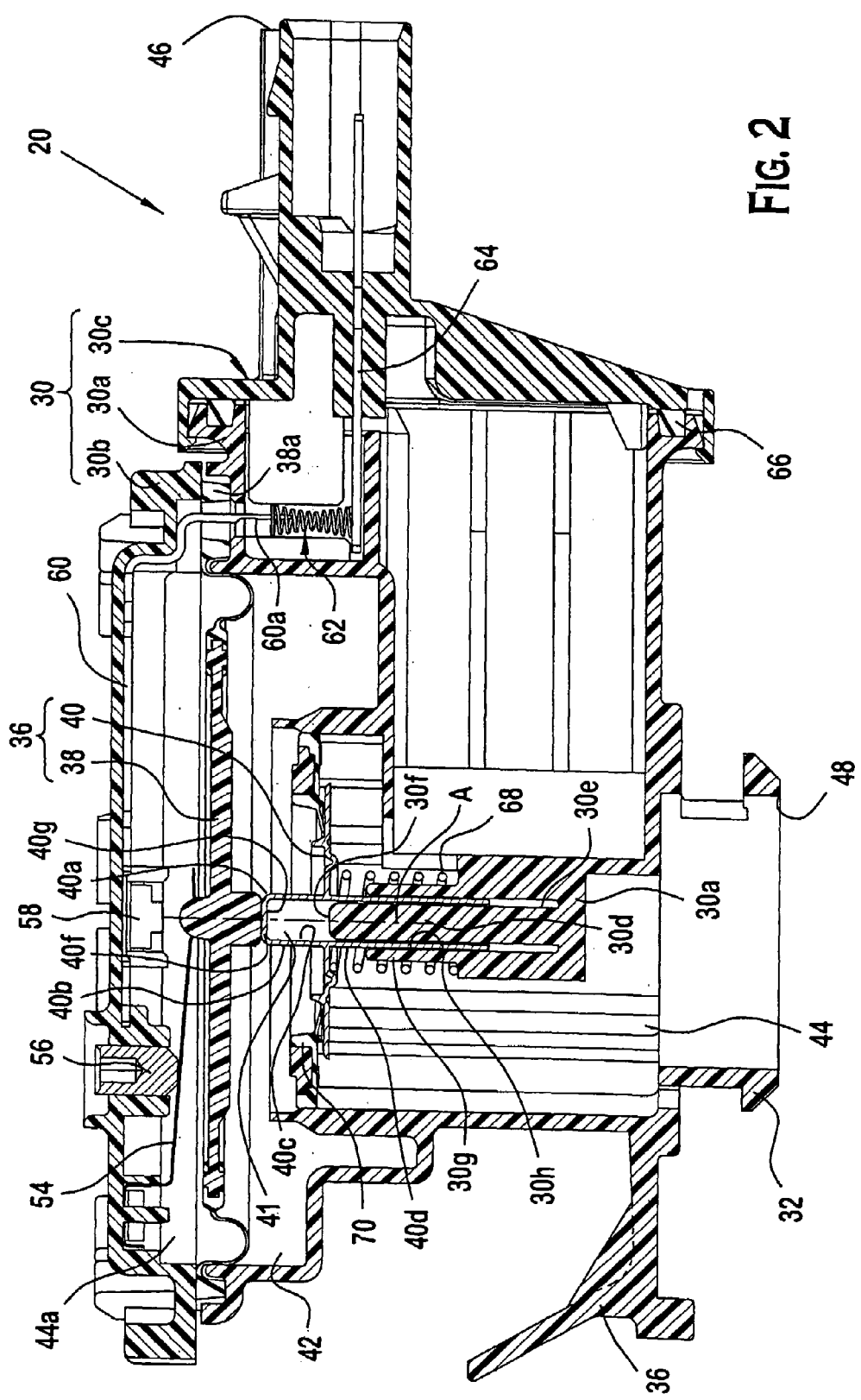
FIG. 2 is a cross-sectional view of a preferred embodiment of an integrated pressure management apparatus according to the present invention.

FIG. 2, shows a preferred embodiment of the IPMA 20 mounted on the fuel vapor collection canister 18. The IPMA 20 includes a housing 30 that can be mounted to the body of the fuel vapor collection canister 18 by a "bayonet" style attachment 32. A seal 34 is interposed between the fuel vapor collection canister 18 and the IPMA 20. This attachment 32, in combination with a snap finger 36, allows the IPMA 20 to be readily serviced in the field. Of course, different styles of attachments between the IPMA 20 and the body 18 can be substituted for the illustrated bayonet attachment 32, e.g., a threaded attachment, an interlocking telescopic attachment, etc. Alternatively, the fuel vapor collection canister 18 and the housing 30 can be integrally formed from a common homogenous material, can be permanently bonded together (e.g., using an adhesive), or the fuel vapor collection canister 18 and the housing 30 can be interconnected via an intermediate member such as a pipe or a flexible hose.

The housing 30 can be an assembly of a main housing piece 30a and housing piece covers 30b and 30c. Although two housing piece covers 30b,30c have been illustrated, it is desirable to minimize the number of housing pieces to reduce the number of potential leak points, i.e., between housing pieces, which must be sealed. Minimizing the number of housing piece covers depends largely on the fluid flow path configuration through the main housing piece 30a and the manufacturing efficiency of incorporating the necessary components of the IPMA 20 via the ports of the flow path. Additional features of the housing 30 and the incorporation of components therein will be further described below.

Signaling 22 occurs when vacuum at the first predetermined pressure level is present in the fuel vapor collection canister 18. A pressure operable device 36 separates an interior chamber in the housing 30. The pressure operable device 36, which includes a diaphragm 38 that is operatively interconnected to a valve 40, separates the interior chamber of the housing 30 into an upper portion 42 and a lower portion 44. The upper portion 42 is in fluid communication with the ambient atmospheric pressure through a first port 46. The lower portion 44 is in fluid communication with a second port 48 between housing 30 the fuel vapor collection canister 18.

The lower portion 44 is also in fluid communicating with a separate portion 44a via a signal passageway that extends through spaces in the housing 30, and through spaces between the intermediate lead frame 62 and the housing 30.

Sealing between the housing pieces 30a,30b for the signal passageway can be provided by a protrusion 38a of the diaphragm 38 that is penetrated by the signal passageway.

Figure 3:
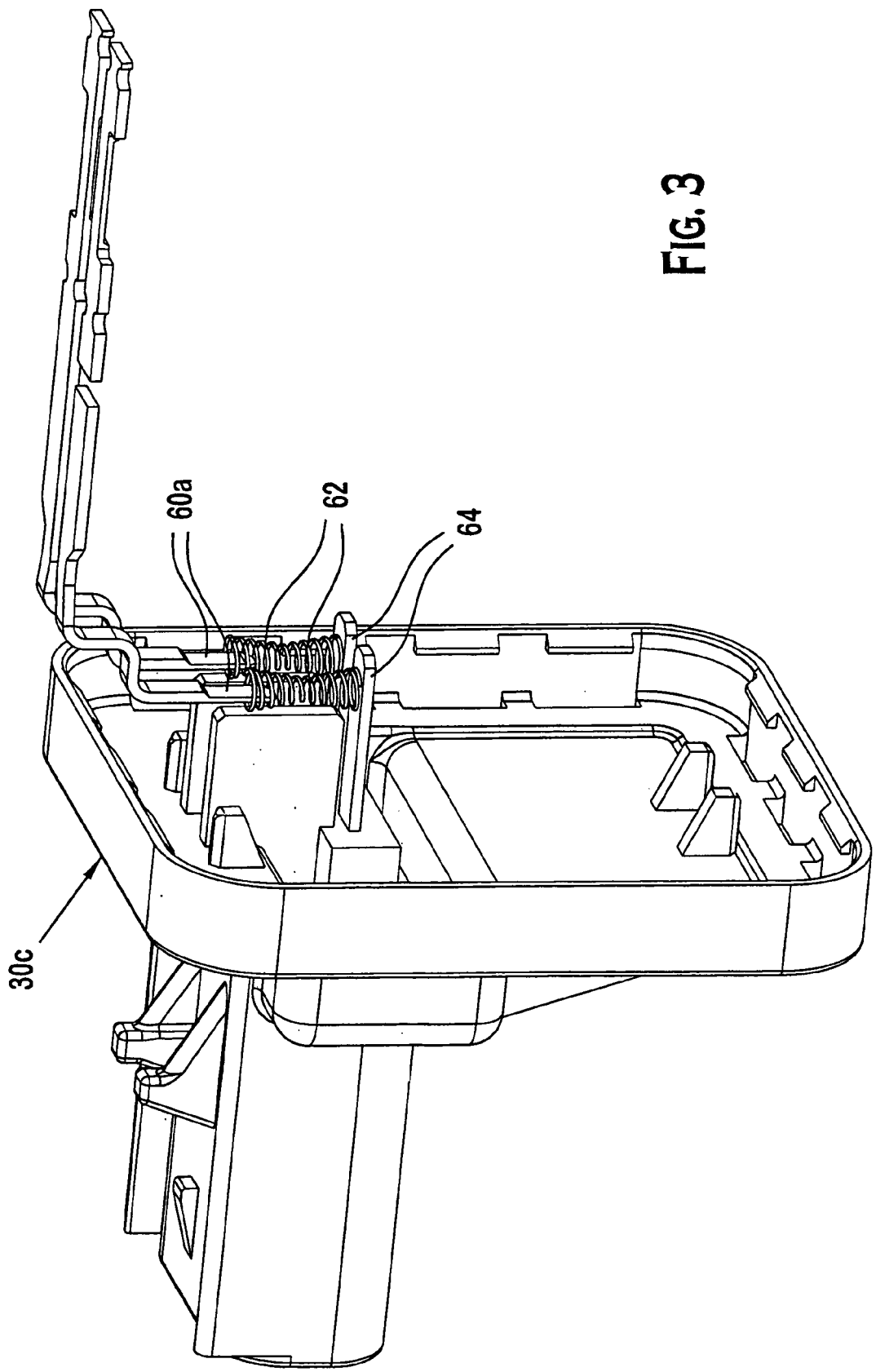
FIG. 3 is a perspective view showing components of the integrated pressure management apparatus. Portions of the integrated pressure management apparatus have been omitted to facilitate understanding of the present invention.
Figure 4:
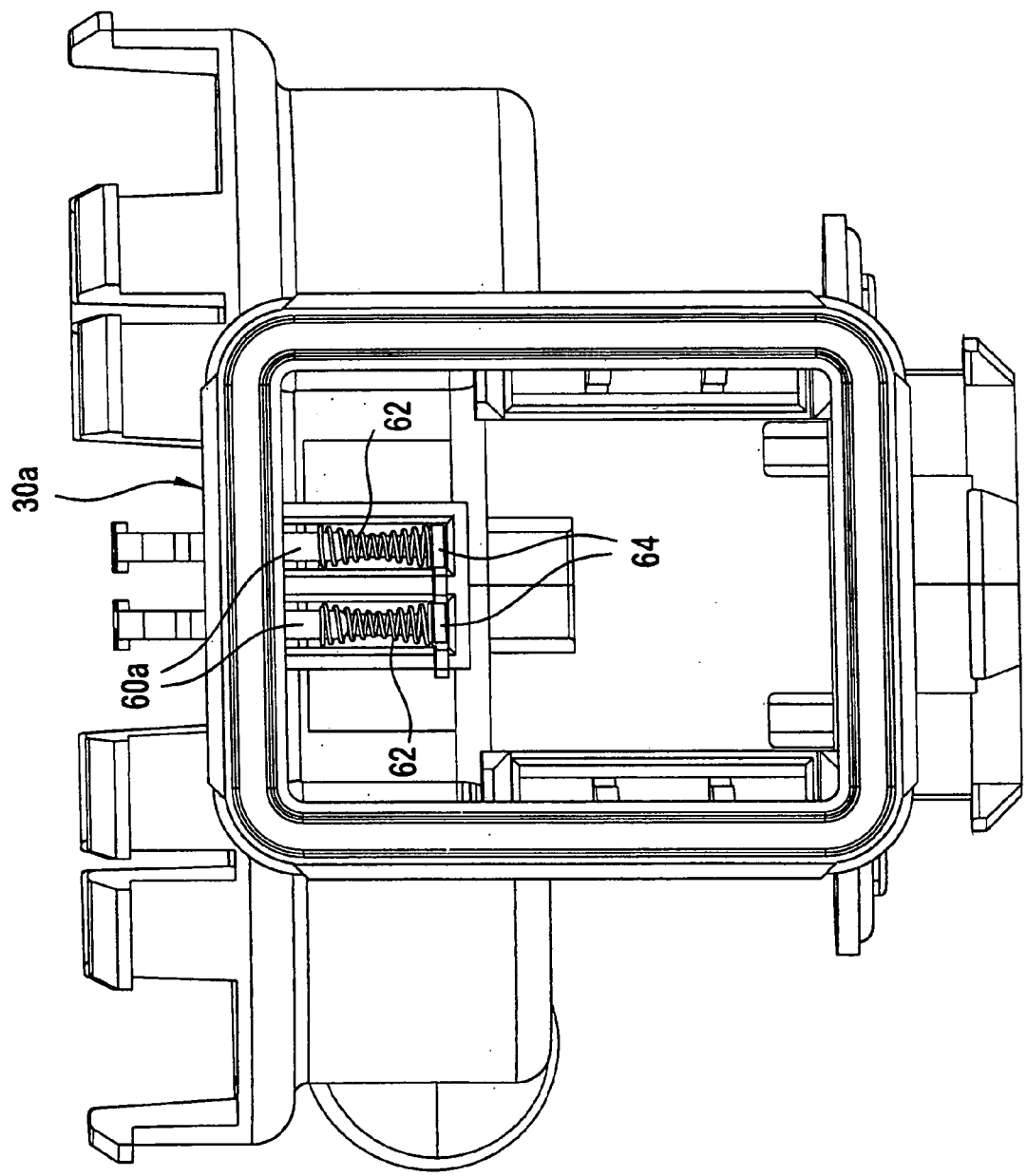
FIG. 4 is an alternate perspective view of the components shown in FIG. 3.

The force created as a result of vacuum in the separate portion 44a causes the diaphragm 38 to be displaced toward the housing part 30b. This displacement is opposed by a resilient element 54, e.g., a leaf spring. A calibrating screw 56 can adjust the bias of the resilient element 54 such that a desired level of vacuum, e.g., a fraction of an inch of water, will depress a switch 58 that can be mounted on a printed circuit board 60. In turn, the printed circuit board is electrically connected via an intermediate lead frame 62 to an outlet terminal 64 supported by the housing part 30c (See FIGS 3 and 4). The intermediate lead frame 62 can also penetrate the protrusion 38a of the diaphragm 38 similar to the signal passageway. The housing part 30c is sealed with respect to the housing parts 30a,30b by an O-ring 66. As vacuum is released, i.e., the pressure in the portions 44,44a rises, the resilient element 54 pushes the diaphragm 38 away from the switch 58, whereby the switch 58 resets.

Pressure relieving 24 occurs as vacuum in the portions 44,44a increases, i.e., the pressure decreases below the calibration level for actuating the switch 58. Vacuum in the fuel vapor collection canister 18 and the lower portion 44 will continually act on the valve 40 inasmuch as the upper portion 42 is always at or near the ambient atmospheric pressure A. At some value of vacuum below the first predetermined level, e.g., one inch of water, this vacuum will overcome the opposing force of a second resilient element 68 and displace the valve 40 away from a lip seal 70. This displacement will open the valve 40 from its closed configuration, thus allowing ambient air to be drawn through the upper portion 42 into the lower the portion 44. That is to say, in an open configuration of the valve 40, the first and second ports 46,48 are in fluid communication. In this way, vacuum in the fuel system 10 can be regulated.

According to a preferred embodiment of the present invention, the valve 40 is formed out of injection molded plastic and normally biased toward lip seal 70 due to the force of the second resilient element 68. To minimize resonance of the valve 40, particularly during pressure relieving 24, a movement damping effect may be provided to the valve 40, e.g., a dashpot can formed by a closed ended tube 40a and a post 30d. Specifically, the valve 40 may be constructed from a tubular stem 40b, which has an inside surface 40c and an outside surface 40d. The inside and outside surfaces 40c,40d extend parallel to one another and to an axis along which the valve 40 translates. A head 40e, which is fixed to the tubular stem 40b, can contiguously engage the lip seal 70 so as to occlude a fluid communication passage between the first and second ports 46,48 during the signaling 22. The tubular stem 40b receives the post 30d, which may be formed as a projection from the housing part 30a. The post 30d has an exterior surface 30e, and together with the inside surface 40c of the tubular stem 40b, defines a first annular gap therebetween.

The post 30d projects from the housing part 30a to an exterior end face 30f, and the tubular stem 40b includes a closed end 40f that defines an inside end face 40g. Thus, a chamber 41 is defined by the exterior end face 30f of the post 30d, the inside surface 40c of the tubular stem 40b, and the inside end face 40f of the tubular stem 40b. The volume of the chamber 41 varies in response to translation of the tubular stem 40b relative to the post 30d.

According to the preferred embodiment, the housing 30a also includes an internal wall 30g that defines an interior surface 30h. Insofar as the internal wall 30g receives the tubular stem 40b, a second annular gap is defined between the interior surface 30h of the wall 30g and the outside surface 40d of the tubular stem 40b.

The post 30d, the tubular stem 40b and the wall 30f effectively form a labyrinth path, including the first and second annular gaps, that restricts fluid flow between the lower portion 44 and the chamber 41, thereby effectively dampening the motion of valve 40, and has the effect of stopping resonance during pressure relieving 24,26.

Also, increasing the fundamental frequency of the valve 40 can minimize the effect of resonance. Since resonant frequencies are dependent on the mass of the valve 40, it is desirable to keep the valve 40 very light by using very thin molded walls, e.g., for the tubular stem 40b and the closed end 40f.

Relieving pressure 26 is provided when there is a positive pressure in the lower portion 44, e.g., when the tank 12 is being refueled. Specifically, the valve 40 is displaced to its open configuration to provide a very low restriction path for escaping air from the tank 12. When the fuel vapor collection canister 18, and hence the lower portions 44, experience positive pressure above ambient atmospheric pressure, the signal passageway communicates this positive pressure to the separate portion 44a. In turn, this positive pressure displaces the diaphragm 38 downward toward the valve 40. A diaphragm pin 39 transfers the displacement of the diaphragm 38 to the valve 40, thereby displacing the valve 40 to its open configuration with respect to the lip seal 70. Thus, pressure in the fuel vapor collection canister 18, e.g., due to refueling, is allowed to escape through the lower portion 44, past the lip seal 70, through the upper portion 42, and through the second port 58.

Relieving pressure 26 is also useful for regulating the pressure in fuel tank 12 during any situation in which the engine is turned off. By limiting the amount of positive pressure in the fuel tank 12, the cool-down vacuum effect will take place sooner.

The present invention has many advantages, including:
  providing relief for positive pressure above a first predetermined pressure value, and providing relief for vacuum below a second predetermined pressure value.
  vacuum monitoring with the present invention in its open configuration during natural cooling, e.g., after the engine is turned off, provides a leak detection diagnostic.
  vacuum relief provides fail-safe operation of the purge flow system in the event that the solenoid fails with the valve in a closed configuration.
  excluding from the fuel vapor management apparatus an electromechanical actuator that would consume electrical power.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An integrated pressure management apparatus comprising:
  a housing defining a fluid communication passage between first and second fluid ports, the housing including a first portion extending along an axis, the first portion having a first surface parallel to the axis;

a poppet being movable between first and second configurations, the first configuration preventing fluid communication between the first and second ports, and the second configuration permitting fluid communication between the first and second ports, the poppet including:
  a second portion being translatable along the axis relative to the housing, the second portion including a tubular stem having a second surface parallel to the axis, the second portion nesting with the first portion so as to define a first gap between the first and second surfaces; and
  a head fixed to the tubular stem, the head contiguously engaging the housing so as to occlude the fluid communication passage when the poppet is in the first configuration; and
a chamber being defined by the first and second portions, and the first gap communicating fluid between the chamber and the fluid communication passage.

2. The integrated pressure management apparatus according to claim 1, wherein the first portion comprises a post projecting from the housing along the axis, the first surface comprises an exterior surface of the post, the tubular stem comprises inside and outside surfaces parallel to the axis, and the second surface comprises the inside surface of the tubular stem, such that the chamber is defined inside the tubular stem.

3. The integrated pressure management apparatus according to claim 2, wherein the post extends along the axis to an exterior end face, the tubular stem extends along the axis to a closure defining an inside end face, and a chamber having a volume that is defined by the exterior end face of the post and the inside surface and inside end face of the tubular stem.

4. The integrated pressure management apparatus according to claim 3, wherein the first gap and the chamber comprise a dashpot damping resonance of the poppet in the second configuration.

5. The integrated pressure management apparatus according to claim 3, wherein the volume of the chamber varies in response to the tubular stem telescoping relative to the post.

6. The integrated pressure management apparatus according to claim 3, wherein the closure is spaced along the axis with respect to the head.

7. The integrated pressure management apparatus according to claim 2, wherein the housing comprises an internal wall extending along and surrounding the axis, the internal wall defines an interior surface parallel to the axis, and the internal wall receives the tubular stem so as to define a second gap between the interior surface of the wall and the outside surface of the tubular stem.

8. The integrated pressure management apparatus according to claim 7, wherein the second gap communicates fluid between the first gap and the fluid communication passage.

9. The integrated pressure management apparatus according to claim 7, wherein the interior surface of the internal wall, the second gap, the outside surface of the tubular stem, the inside surface of the tubular stem, the first gap, and the exterior surface of the post comprise concentric annuli.

10. The integrated pressure management apparatus according to claim 9, further comprising:
  a resilient element biasing the poppet toward the first configuration.

11. The integrated pressure management apparatus according to claim 10, wherein the resilient element comprises an annular compression spring extending along the axis between first and second ends, the first end contiguously engaging the housing, and the second end contiguously engaging the head, the annular compression spring being disposed concentrically about the interior wall of the housing.

12. The integrated pressure management apparatus according to claim 1, wherein the poppet comprises injection molded plastic having thin molded walls so as to minimize resonance of the poppet by minimizing mass of the poppet.

13. The integrated pressure management apparatus according to claim 1, wherein the housing comprises a seat, and the head contiguously engages the seat in the first configuration.

14. The integrated pressure management apparatus according to claim 1, wherein the fuel vapor pressure management apparatus excludes an electromechanical actuator.

15. A fuel system for supplying fuel to an internal combustion engine, the fuel system comprising:
  a fuel tank having a headspace;
  a fuel vapor collection canister having first and second sides, the first side being in fluid communication with the headspace;
  an intake manifold of the internal combustion engine;
  a purge valve including an inlet and an outlet, the inlet being in fluid communication with the first side of the fuel vapor collection canister and the outlet being in fluid communication with the intake manifold; and
  a fuel vapor pressure management apparatus including first and second ports, the first port being in fluid communication with the second side of the fuel vapor collection canister, and the second port being in fluid communication with atmosphere, a first arrangement of the fuel vapor pressure management apparatus occurs when there is a first negative pressure level in the fuel vapor collection canister relative to atmosphere, a second arrangement of the fuel vapor pressure management apparatus permits a first fluid flow from atmosphere to the fuel vapor collection canister when there is a second negative pressure level less than the first negative pressure level, and a third arrangement of the fuel vapor pressure management apparatus permits a second fluid flow from the fuel vapor collection canister to atmosphere when there is a positive pressure in the fuel vapor collection canister relative to atmosphere, the fuel vapor pressure management apparatus including:
    a housing defining a fluid communication passage extending between the first and second ports, the housing including a first portion extending along an axis, the first portion having a first surface parallel to the axis; and
    a poppet being movable between first and second configurations, the first configuration preventing fluid communication between the first and second ports in the first arrangement, and the second configuration permitting fluid communication between the first and second ports in the second and third arrangements, the poppet including:
      a second portion being translatable along the axis relative to the housing, the second portion including a tubular stem having a second surface parallel to the axis, the second portion nesting with the first portion so as to define a gap between the first and second surfaces; and a head fixed to the tubular stem, the head contiguously engaging the housing so as to occlude the fluid communication passage in the first arrangement.

16. The fuel system according to claim 15, wherein the first portion comprises a post projecting from the housing along the axis, the first surface comprises an exterior surface of the post, the tubular stem comprises inside and outside surfaces parallel to the axis, and the second surface comprises the inside surface of the tubular stem.

17. The fuel system according to claim 16, wherein the post extends along the axis to an exterior end face, the tubular stem extends along the axis to a closure defining an inside end face, and a chamber is defined by the exterior end face of the post and the inside surface and inside end face of the tubular stem.

18. The fuel system according to claim 17, wherein the first gap and the chamber comprise a dashpot damping resonance of the poppet in the second arrangement.

19. The fuel system according to claim 15, wherein the fuel vapor pressure management apparatus comprises a diaphragm having a peripheral portion fixed with respect to the housing and a central portion moving the poppet to the second configuration in the second and third arrangements.

20. The fuel system according to claim 15, wherein the fuel vapor pressure management apparatus comprises a switch signaling the first negative pressure level.

21. The fuel system according to claim 20, further comprising:
an engine control unit operatively connected to the purge valve and to the switch.

22. The fuel system according to claim 15, wherein the fuel vapor pressure management apparatus comprises a resilient element biasing the head toward the first configuration.

23. A method of using naturally forming vacuum to evaluate a fuel system supplying fuel to an internal combustion engine including an intake manifold, the fuel system including a fuel tank having a headspace, and a fuel vapor collection canister having first and second sides, the first side of the fuel vapor collection canister being in fluid communication with the headspace and with a purge valve, the method comprising:

coupling a fuel vapor pressure management apparatus in fluid communication between the second side of fuel vapor collection canister and atmosphere, the fuel vapor management apparatus including:
a housing defining a fluid communication passage extending between first and second fluid ports; and
a poppet being movable between first and second configurations with respect to the housing, the first configuration preventing fluid communication between the first and second ports, and the second configuration permitting fluid communication between the first and second ports;
damping resonance of the poppet in the second configuration.

24. The method according to claim 23, wherein the damping resonance comprises operatively coupling a dashpot between the poppet and the housing.

25. The method according to claim 23, further comprising:
excluding from the fuel vapor management apparatus an electromechanical actuator.

26. The method according to claim 23, further comprising:
detecting in the first configuration of the poppet the vacuum that naturally forms in the headspace.

27. The method according to claim 26, wherein the detecting comprises sensing at the second side of fuel vapor collection canister a first negative pressure level relative to atmosphere.

28. The method according to claim 27, further comprising:
relieving excess negative pressure below the first negative pressure level relative to atmosphere.

29. The method according to claim 23, further comprising:
relieving positive pressure above a second pressure level relative to atmosphere.

* * * * *